Sept. 20, 1971   F. LEONAWICZ   3,605,926
SNOWMOBILE WITH ANTISKID AND STABILIZING ATTACHMENTS
Filed Aug. 8, 1969   3 Sheets-Sheet 1

INVENTOR.
FELIX LEONAWICZ

INVENTOR.
FELIX LEONAWICZ

INVENTOR.
FELIX LEONAWICZ

United States Patent Office

3,605,926
Patented Sept. 20, 1971

3,605,926
SNOWMOBILE WITH ANTISKID AND STABILIZING ATTACHMENTS
Felix Leonawicz, Espanong Road, Nolan's Point,
P.O. Box 162, Lake Hopatcong, N.J. 07849
Filed Aug. 8, 1969, Ser. No. 848,566
Int. Cl. B62m 27/02
U.S. Cl. 180—5R                                          10 Claims

ABSTRACT OF THE DISCLOSURE

This specification discloses a snowmobile with attachments which adapt it for use on ice and hard-packed snow. One of these attachments comprises runners of V-shaped cross-section that are applied to the front steering runners of the vehicle. The other is a stabilizer mounted on the rear of the snowmobile. The stabilizer consists essentially of a pair of arms, each pivotally connected to the rear end of the vehicle and extending downwardly and outwardly with their lower ends assuming a position outboard of the snowmobile. Pivotally mounted on the free end of each arm is a shoe having a chisel edge. Each arm comprises telescoping sections which render it adjustable in length and a tension spring has its ends connected to the arms to generate inward pressure thereon.

---

The present invention relates to snowmobiles and is concerned primarily with attachments for such a vehicle which adapt it for use on ice and hard-packed snow.

BACKGROUND OF THE INVENTION

The modern snowmobile now meeting with widespread usage is designed primarily for use on snow that is not tightly compacted. When used on snow in this condition, they are generally satisfactory. However, when attempt is made to use these snowmobiles on ice or hard-packed snow, certain difficulties arise.

The front runners of a conventional snowmobile which are used for steering purposes are flat or substantially so. They do not have the ability to bite into ice or packed snow. Hence the steering capabilities under these conditions are impaired.

Also where a snowmobile is travelling over ice or packed snow a tendency for the rear end to sway, tip or move laterally develops. This tendency is particularly noticeable at high speeds. While attempt has been made to stabilize the rear end of a snowmobile, there is no known device of this character which achieves stabilization by engagement with the surface over which the vehicle travels outboard of the snowmobile or its main runners.

OBJECTS OF THE INVENTION

In view of the conditions above outlined, the invention has the following objects:

(a) To provide auxiliary runners for the front runners and which have sharp edges which engage the surface being travelled.

(b) To provide auxiliary runners of V-shaped cross-section with the apices of the V's engaging the travelled surface.

(c) To provide auxiliary runners of the type noted which may be readily attached to, or removed from, the conventional front runners.

(d) To provide a stabilizer that is mounted on the rear end of a snowmobile and which includes a pair of shoes that engage the travelled surface outboard of the vehicle.

(e) To provide a stabilizer of the type noted which includes means for yieldably urging the shoes toward each other.

(f) To provide a stabilizer of the character aforesaid in which each shoe is pivotally mounted on one end of an arm, the other end of which is pivotally connected to the snowmobile near its center of gravity.

(g) To provide a stabilizer of the kind described in which the arms on which the shoes are mounted are adjustable in length, and, (h) To provide a stabilizer of the type noted in which the shoes have chisel edges.

Various other more detailed objects and advantages of the invention such as arise in connection with carrying out the above noted ideas in a practical embodiment will in part become apparent and in part be hereinafter stated as the description of the invention proceeds.

SUMMARY OF THE INVENTION

The foregoing objects are achieved by providing auxiliary runners which may be attached to or removed from the conventional front runners and a stabilizer that is mounted on the rear end of the snowmobile.

The auxiliary runners are of V cross-section and each include attaching devices which secure them in position beneath the conventional runners and which are detachable to permit disassembly.

The stabilizer comprises a pair of arms, each including a pair of telescoping sections and means to secure an adjusted position, a pivotal mounting for the inner end of one arm section near the center of gravity of the snowmobile at its rear end, a shoe having a chisel edge pivotally mounted on the free end of an arm section; and a tension spring having its ends secured to the arm sections that are pivotally mounted on the vehicle. The arms have an extent sufficient to locate the shoes outboard of the snowmobile.

For a full and more complete understanding of the invention, reference may be had to the following description and accompanying drawings wherein.

Figure 1:
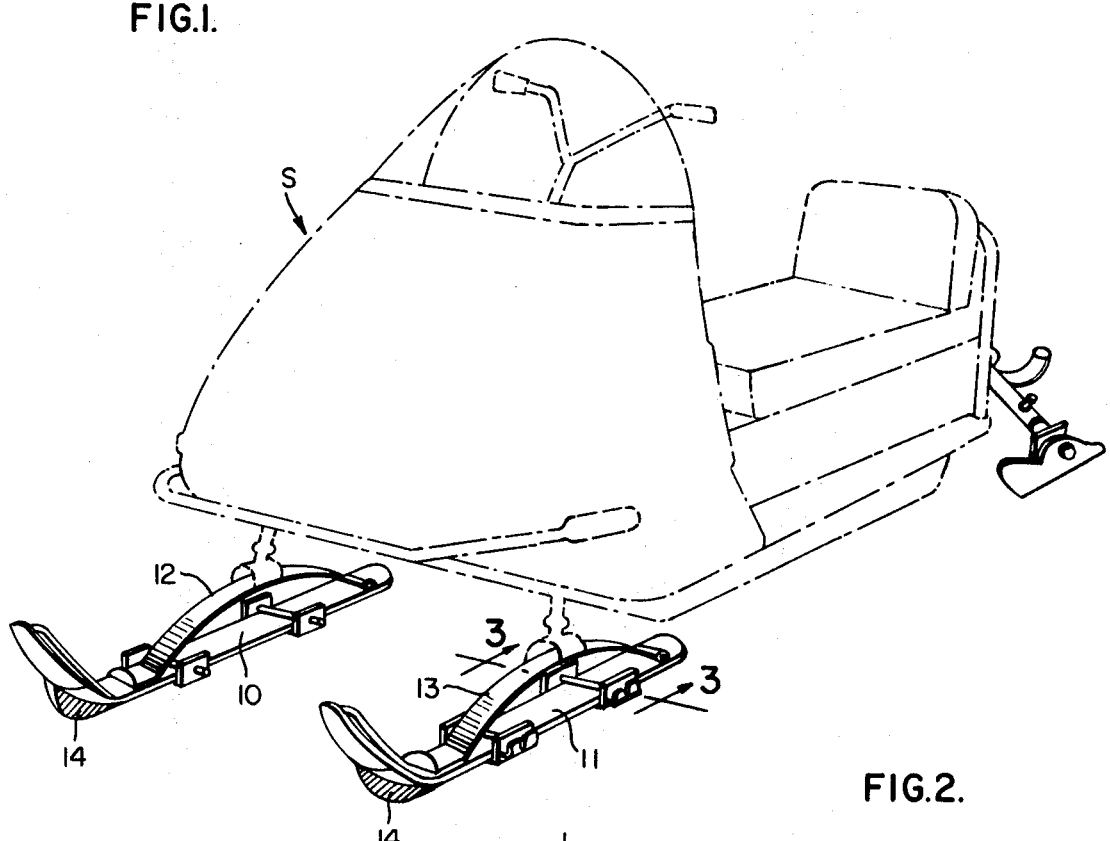
FIG. 1 is a perspective developing the main body of a snowmobile in phantom and illustrating the auxiliary front runners as applied and one of the shoes and a portion of its mounting structure of the stabilizer at the rear end.

Referring now to the drawings, it is first noted that the snowmobile S is taken as one type of vehicle to which the attachments of this invention may be applied. Obviously, they are adapted for use with just about any snowmobile having a pair of front runners.

Snowmobile S includes a pair of conventional runners 10 and 11 which ordinarily are flat and which are mounted on leaf springs 12 and 13 secured to the vehicle body. An auxiliary runner 14 is removably mounted on the underside of each runner 10 and 11.

Figure 3:
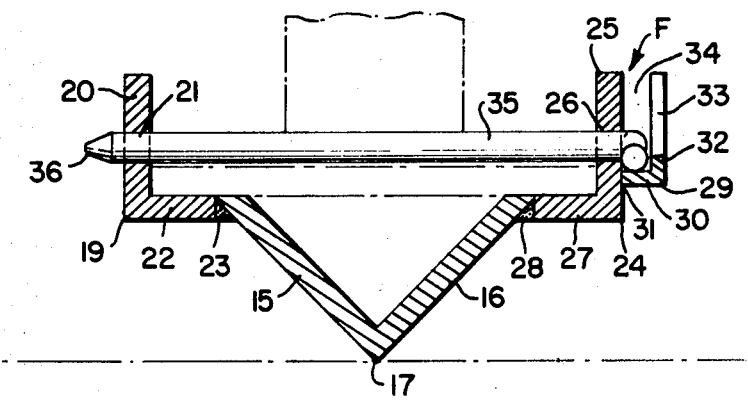
FIG. 3 is a detailed section on an enlarged scale through one of the auxiliary runners, being taken about on the plane represented by the line 3—3 of FIG. 1.
Figure 4:
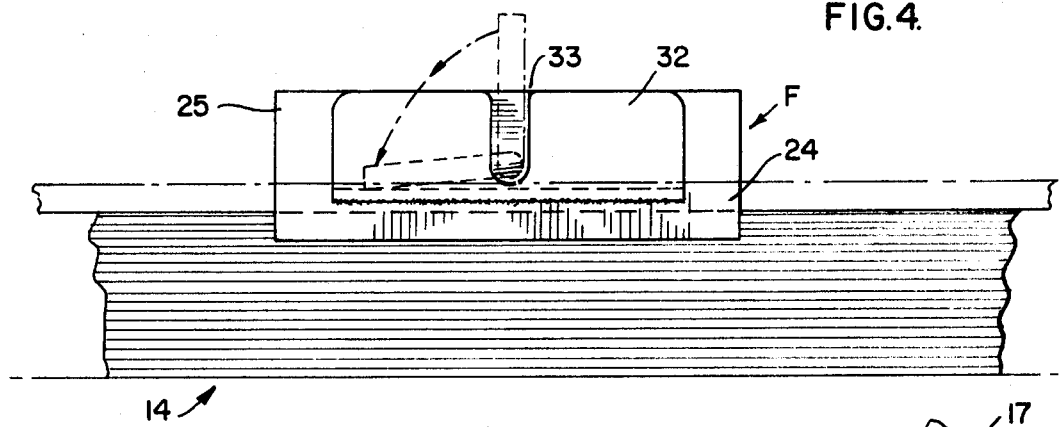
FIG. 4 is a detailed elevation also on an enlarged scale looking at a portion of an auxiliary runner from the side.
Figure 5:
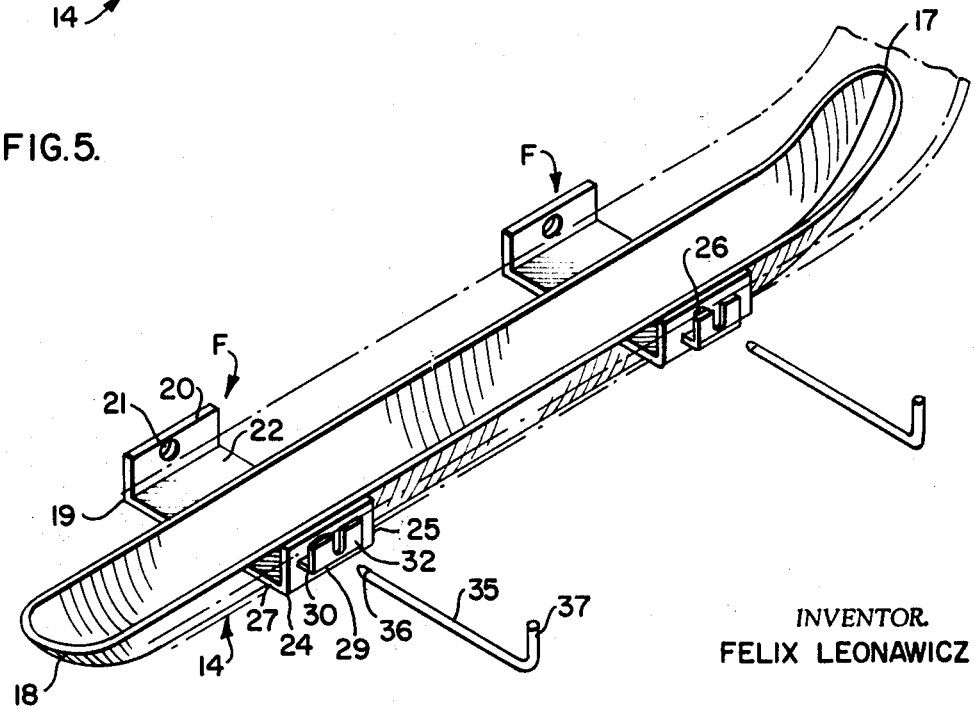
FIG. 5 is a perspective of one of the auxiliary runners with elements of the positioning devices shown in exploded relation.

Referring now more particularly to FIGS. 3, 4 and 5, one of the auxiliary runners 14 will be described in detail. The main extent of runner 14 is V-shaped in cross-section as clearly shown in FIG. 3. This shape is provided by inclined side walls 15 and 16 which meet at an apex 17. As shown in FIG. 5, the side walls 15 and 16 converge at the forward end and are bent upwardly to form a rounded upraised nose 17. They are joined at the tracking end by a curved wall 18 integral therewith.

Each runner 14 is detachably secured to one of the conventional runners 10 or 11 by a pair of fastening devices, each being identified in its entirety by the reference character F. As these devices are duplicates, only one is herein described in detail.

Each device F comprises a bracket 19 of L cross-section made up of a vertical wall 20 having an aperture 21 (FIGS. 3 and 5) and a horizontal part 22 the free edge of which is secured to the upper edge of wall 15 as by welding at 23. For the purposes of this description, it will be assumed that wall 15 is the inner wall of each runner 14.

A second bracket 24 also of L cross-section has a vertical wall 25 formed with an aperture 26 in alignment with aperture 21 and a horizontal part 27 the free edge of which is anchored to wall 16 at its upper edge by welding at 28. A retaining bracket 29 of L cross-section has a bottom part 30 secured to the outer face of bracket wall 25 by welding at 31 and a vertical wall 32 found with a slot 33 that opens onto the upper edge of wall 32. Walls 25 and 32 are in spaced relation defining a space 34 therebetween. Slot 33 is in alignment with apertures 21 and 26.

A fastening pin 35 has a pointed end 36 and an end portion 37 normal to the main body of pin 35. After a runner 14 has been positioned beneath one of the runners 10 or 11, pin 35 is inserted through the aligned slot 33 and apertures 21 and 26 until the end portion 37 is received in space 34. Pin 35 is then rotated into the position of FIG. 4 in which the end portion 37 engages bracket bottom 30. It is held in its inserted position by bracket wall 32.

Figure 2:
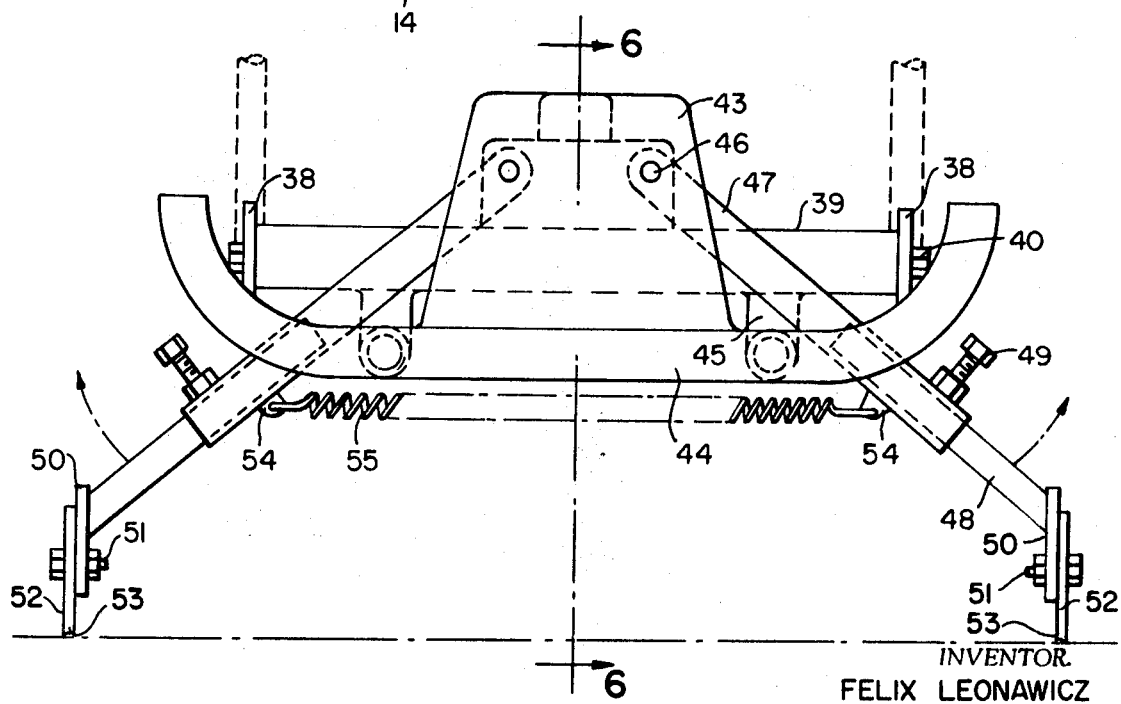
FIG. 2 is a view in elevation looking at the rear end with the stabilizer mounted thereon.
Figure 6:
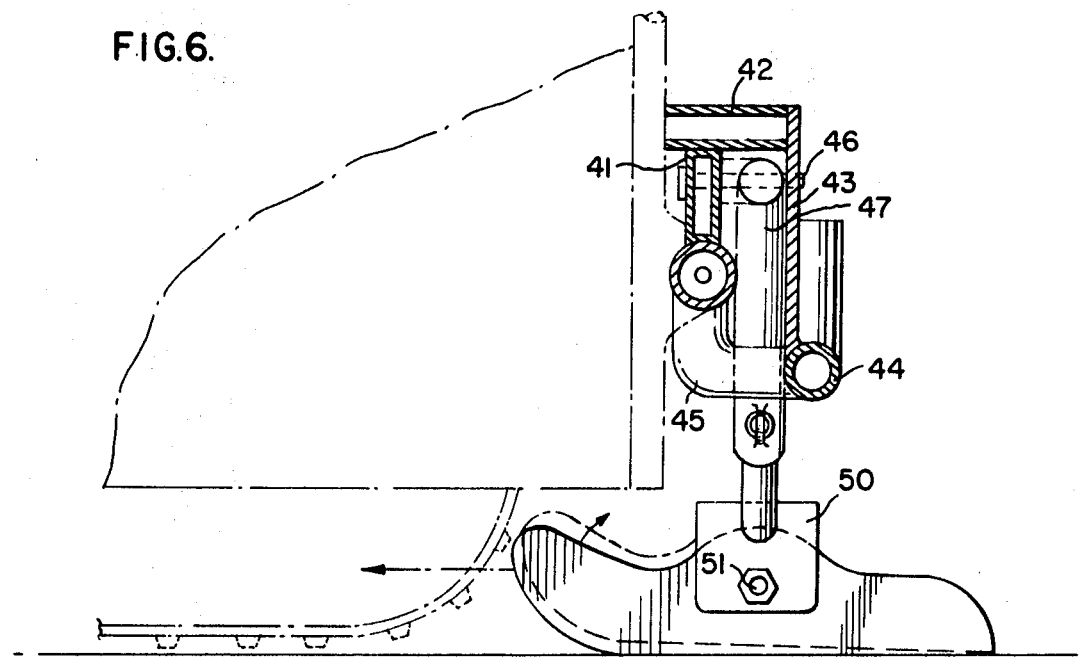
FIG. 6 is a vertical longitudinal section through the stabilizer, being taken about on the plane represented by the line 6—6 of FIG. 2 and illustrating the rear portion of the snowmobile in phantom and portions of the stabilizer in elevation.
Figure 7:
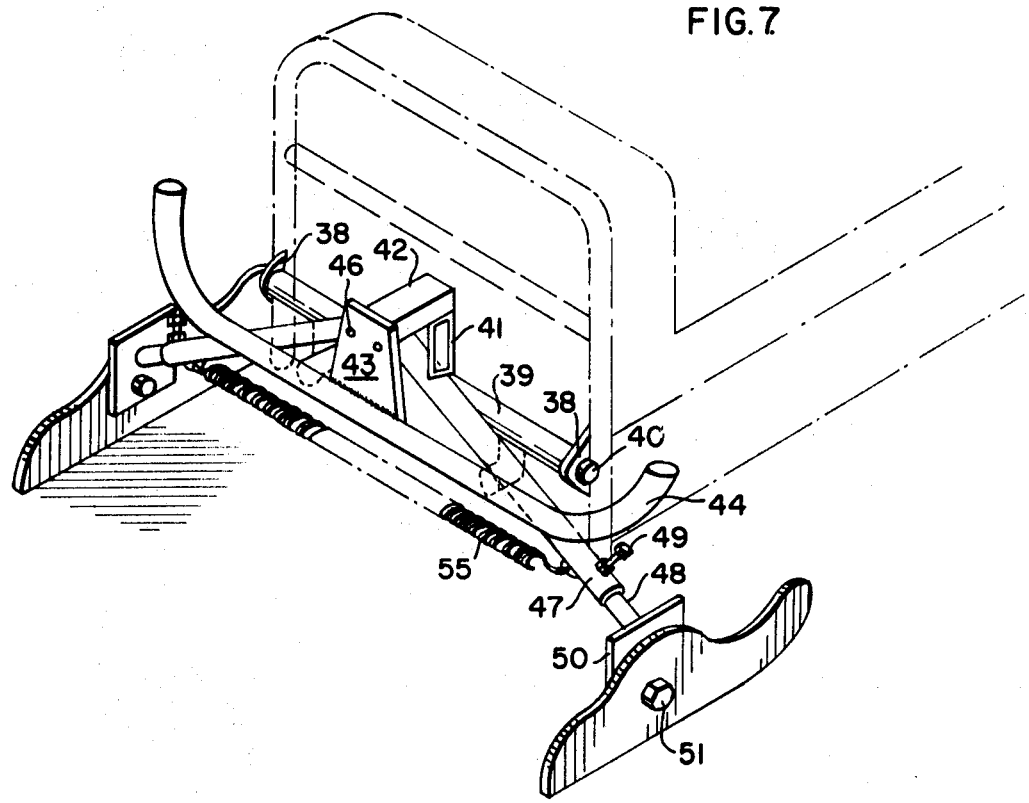
FIG. 7 is a perspective of the stabilizer as mounted on the rear end of the snowmobile.

Referring now to FIGS. 2, 6 and 7, the construction of the stabilizer will be described. Mounted on the rear end of the body of snowmobile S and extending therefrom are a pair of ears 38. Extending between ears 38 is a cross bar 39, the ends of which may be anchored to ears 38 in any preferred runner as by screw bolts 40. If desired, cross bar 39 may be tubular and a solid rod passed therethrough with the ends of the rod threaded and receiving nuts comparable to bolts 40.

A hollow boxlike support 41 upstands from bar 39, being welded thereto. Mounted on the upper end wall of support 41 is another boxlike element 42 which is welded to support 41. The inner end of element 42 engages the vehicle body as depicted in FIG. 6 and optionally may be secured thereto as by welding.

Depending from the end of element 42 remote from the vehicle body is a plate 43. A bumper 44 is welded to the lower edge of plate 43 and is further supported by L-shaped anchoring members 45.

Pivotally mounted between boxlike support 41 and plate 43 on pivot pins 46 are tubular arm sections 47. Telescopically received in each arm section 47 is an outer arm section 48. Set screws 49 may be loosened to permit adjustment of arm sections 47 and 48 or tightened to hold adjusted positions.

A supporting plate 50 is anchored to the free end of each arm section 48 as by welding and pivotally mounted on each plate 50 as by a bolt 51 is a shoe 52 having a chisel edge 53 (FIG. 2). Each arm section 47 has a depending ear 54 and a tension coil spring 55 has its ends anchored to ears 54. Spring 55 tends to draw the arms made up of sections 47 and 48 together and, due to the inclination of the latter, a downward component of force is created by the spring which urges the edges 53 into the travelled surface.

OPERATION

While the manner in which the above described mechanism functions is believed to be obvious from the illustrations of the drawings and description of parts set forth above, it is briefly outlined as follows.

The stabilizer at the rear may be permanently mounted on the snowmobile, but arm sections 48 and shoes mounted thereon may be removed when conditions do not require their use. The telescopic arm sections are adjusted to insure that the shoes 52 are disposed outboard of the vehicle body sufficiently to provide the required degree of stability. As the snowmobile travels over snow or ice chisel edges 53 of shoes 52 are constantly urged under yielding pressure of spring 55 into biting engagement with the travelled surface. The pivotal mounting of the shoes on plates 50 and the pivotal mounting of arm sections 47 near the center of gravity of the vehicle accommodates variations in surface conditions, speed, etc.

When the use of auxiliary shoes 14 is indicated, they are applied under front runners 10 and 11 in the manner described above. When such use is not required, they are easily removed.

While a preferred specific embodiment of the invention is hereinbefore set forth, it is to be clearly understood that the invention is not to be limited to the exact constructions, mechanisms and devices illustrated and described because various modifications of these details may be provided in putting the invention into practice.

What is claimed is:

1. For use with a snowmobile having a body with a rear end, a stabilizer comprising:
   (a) a mounting member adapted to be secured to said rear end,
   (b) a pair of arms each having an end pivotally connected to said mounting member and extending outboard of said member,
   (c) a shoe pivotally carried by each arm at its free end and having a surface engaging chisel edge, and
   (d) means for urging said arms together under yielding pressure whereby said edges are forced against said surface.

2. The stabilizer of claim 1 in which each of said arms is adjustable in length and means for securing an adjusted position of each arm.

3. The stabilizer of claim 2 in which each adjustable arm comprises a pair of telescopic sections and the means for securing an adjusted position of the arm sections takes the form of a set screw mounted on one arm section.

4. The stabilizer of claim 1 in which the means for urging the arms together takes the form of a tension spring having its ends anchored to each arm.

5. The stabilizer of claim 1 in which said mounting member carries stop members which limit the pivotal motion of said arms under the influence of said yielding pressure when said surface engaging chisel edge is disengaged from such surface.

6. In combination with a snowmobile having a pair of conventional front runners, an attachment comprising:
   (a) an auxiliary runner of V cross-section defined by a pair of inclined walls meeting at an apex,
   (b) means for detachably mounting the auxiliary runner centrally disposed on the underside of one of said conventional runners with the apex exposed in a downward position, said means extending above both the upper edge of the auxiliary runner wall and said conventional runner, and
   (c) fastening means extending over said conventional runner from said means for detachably mounting the auxiliary runner.

7. The attachment of claim 6 in which the mounting means comprises a pair of spaced fastening devices, each including a retaining pin that passes over the conventional runner to which the auxiliary runner is secured.

8. The attachment of claim 7 in which each fastening device comprises a pair of laterally spaced brackets, each secured to a wall of the auxiliary runner and having a wall extending above the upper edge of the auxiliary runner wall, said bracket walls having aligned apertures; said pin passing through said aligned apertures; and means for holding said pin in retaining position.

9. In combination with a snowmobile to improve the steering capabilities and stability against lateral motion thereof on ice or hard-packed snow, which snowmobile includes a pair of conventional front runners and a body,
  (a) a pair of auxiliary runners of V-shape cross-section defined by inclined side walls meeting at apices,
  (b) means for detachably securing each of said auxiliary runners centrally disposed on the underside of one of said conventional runners with the apex exposed in a downward position, said means extending above both the upper edge of the auxiliary runner wall and said conventional runner,
  (c) fastening means extending over said conventional runner from said means for detachably mounting the auxiliary runner, and
  (d) a stabilizer mounted on the rear end of the body and including:
    (1) a mounting member adapted to be secured to said rear end,
    (2) a pair of arms each having an end pivotally connected to said mounting member and extending outboard of said member,
    (3) a shoe pivotally carried by each arm at its free end and having a surface engaging chisel edge, and
    (4) means for urging said arms together under yielding pressure whereby said edges are forced against said surface.

10. The stabilized snowmobile combination of claim 9 in which means (b) comprises a pair of fastening devices for each auxiliary runner and each fastening device consists of a pair of laterally spaced brackets mounted on said walls, extending thereabove, and formed with aligned apertures, a pin passing through said apertures and over the conventional runner, and means for retaining the pin in holding position.

References Cited

UNITED STATES PATENTS

| | | | |
|---|---|---|---|
| 302,762 | 7/1884 | Morrell | 280—28 |
| 2,099,731 | 11/1937 | Gelbman | 280—21X |
| 2,404,402 | 7/1946 | Porter | 280—28 |
| 2,482,849 | 12/1969 | Puetz | 180—5X |

FOREIGN PATENTS

| | | | |
|---|---|---|---|
| 39,234 | 6/1924 | Norway | 180—6 |

RICHARD J. JOHNSON, Primary Examiner

U.S. Cl. X.R.

280—21, 28